United States Patent
Song et al.

(10) Patent No.: US 12,167,397 B2
(45) Date of Patent: *Dec. 10, 2024

(54) SIGNAL RECEPTION APPARATUS AND METHOD AND COMMUNICATIONS SYSTEM

(71) Applicant: FUJITSU LIMITED, Kawasaki Kanagawa (JP)

(72) Inventors: Lei Song, Beijing (CN); Lei Zhang, Beijing (CN); Xin Wang, Beijing (CN); Zhe Chen, Beijing (CN); Guoyu Zhang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,616

(22) Filed: Feb. 12, 2024

(65) Prior Publication Data
US 2024/0224279 A1  Jul. 4, 2024

Related U.S. Application Data

(60) Division of application No. 16/898,926, filed on Jun. 11, 2020, now Pat. No. 11,924,829, which is a
(Continued)

(51) Int. Cl.
*H04W 72/20*  (2023.01)
*H04W 72/0446*  (2023.01)
*H04W 72/56*  (2023.01)

(52) U.S. Cl.
CPC ....... *H04W 72/20* (2023.01); *H04W 72/0446* (2013.01); *H04W 72/56* (2023.01)

(58) Field of Classification Search
None
See application file for complete search history.

(56) References Cited

U.S. PATENT DOCUMENTS

2015/0215905 A1  7/2015  Park et al.
2015/0223208 A1  8/2015  Park et al.
(Continued)

FOREIGN PATENT DOCUMENTS

CN  104704750 A  6/2015
CN  104704755 A  6/2015
(Continued)

OTHER PUBLICATIONS

International Search Report issued by the State Intellectual Property Office of the P.R. China for corresponding International Patent Application No. PCT/CN2018/072294, mailed on Sep. 28, 2018, with an English translation.
(Continued)

*Primary Examiner* — Nguyen H Ngo
(74) *Attorney, Agent, or Firm* — Myers Wolin, LLC

(57) ABSTRACT

A terminal includes a memory, and processor circuitry coupled to the memory and configured to receive a first signal including first control information at a first time domain resource section according to an assumption that a network device uses a first transmission configuration indication (TCI) state, the first signal being physical downlink control channel (PDCCH), the first control information being downlink control information (DCI), and receive a second signal at a second time domain resource section according to an assumption that the network device uses a second transmission configuration indication state, a starting position of the second time domain resource section being determined according to a reference time domain resource section, the reference time domain resource section being a time domain symbol at a last position in the PDCCH where the DCI is located on a time axis.

15 Claims, 7 Drawing Sheets

Related U.S. Application Data continuation of application No. PCT/CN2018/072294, filed on Jan. 11, 2018.

(56) References Cited

U.S. PATENT DOCUMENTS

| | | | |
|---|---|---|---|
| 2017/0290046 A1* | 10/2017 | Sun | H04W 72/0466 |
| 2017/0302491 A1 | 10/2017 | Yang et al. | |
| 2018/0279285 A1 | 9/2018 | Yang et al. | |
| 2018/0302889 A1* | 10/2018 | Guo | H04W 72/046 |
| 2020/0022175 A1* | 1/2020 | Xiong | H04L 5/001 |
| 2020/0100219 A1* | 3/2020 | Takeda | H04W 72/23 |
| 2020/0128542 A1* | 4/2020 | Tang | H04W 72/0446 |
| 2020/0288479 A1 | 9/2020 | Xi et al. | |
| 2020/0389847 A1* | 12/2020 | Deng | H04W 52/0219 |
| 2020/0395988 A1* | 12/2020 | Lee | H04L 5/0087 |

FOREIGN PATENT DOCUMENTS

| | | |
|---|---|---|
| CN | 105812105 A | 7/2016 |
| CN | 107370589 A | 11/2017 |
| WO | 2016109926 A1 | 7/2016 |
| WO | 2017/095470 A1 | 6/2017 |
| WO | 2017/126920 A1 | 7/2017 |
| WO | 2017/196246 A2 | 11/2017 |

OTHER PUBLICATIONS

Written Opinion of the International Searching Authority issued by the State Intellectual Property Office of the P.R. China for corresponding International Patent Application No. PCT/CN2018/072294, mailed on Sep. 28, 2018, with an English translation.
Notice of Reasons for Refusal issued by the Japan Patent Office for corresponding Japanese Patent Application No. 2020-531597, mailed on Jun. 29, 2021, with an English translation.
Qualcomm, "Beam management for NR", Agenda Item: 7.2.2.3, 3GPP TSG-RAN WG1 Meeting #91, R1-1720662, Reno, USA, Nov. 27-Dec. 1, 2017.
Samsung, "On Beam Indication", Agenda Item: 7.2.2.6, 3GPP TSG-RAN WG1 Meeting #90bis, R1-1717627, Prague, CZ, Oct. 9-13, 2017.
LG Electronics, "Discussion on DL/UL scheduling and HARQ in NR", Agenda Item: 8.1.3.3.1, 3GPP TSG-RAN WG1 Meeting #88bis, R1-1704915, Spokane, USA, Apr. 3-7, 2017.
AT&T, "Design of Polar Codes for Control Channel in NR", Agenda Item: 5.1.5.2.1, 3GPP TSG-RAN WG1 NR Ad-Hoc Meeting, R1-1700324, Spokane, USA, Jan. 16-20, 2017.
Partial supplementary European search report issued by the European Patent Office for corresponding European Patent Application No. 18899377.8-1215, mailed on Aug. 9, 2021.
Samsung, "Discussion on beam indication for PDSCH", Agenda Item: 7.2.2.6, 3GPP TSG-RAN WG1 Meeting #90bis, R1-1717612, Prague, Czech, Oct. 9-13, 2017.
Mediatek Inc., "Futher Details on Beam Management", Agenda Item: 7.2.2.3, Ha,3GPP TSG-RAN WG1 Meeting #91, R1-1719565, Reno, U.S., Nov. 27-Dec. 1, 2017.
First Notification of Office Action and Search Report issued by the China National Intellectual Property Administration for corresponding Chinese Patent Application No. 201880078063.5, dated Jul. 27, 2022, with an English translation.
Interdigital, Inc., "Remaining issues on beam management", Agenda Item: 7.2.2.3, 3GPP TSG-RAN WG1 Meeting #91, R1-1720630, Reno, USA, Nov. 27-Dec. 1, 2017.
Samsung, "Remaining details on PDSCH beam indication", Agenda Item: 7.2.2.6, 3GPP TSG-RAN WG1 Meeting #91, R1-1720302, Reno, USA, Nov. 27-Dec. 1, 2017.
Samsung, "Parameters for beam management", Agenda Item: 6.2.2.6, 3GPP TSG-RAN WG1 NR AH#3, R1-1715951, Nagoya, Japan, Sep. 18-21, 2017.
Second Notification of Office Action issued by the China National Intellectual Property Administration for corresponding Chinese Patent Application No. 201880078063.5, dated Mar. 17, 2023, with an English translation.
Non-Final Office Action issued by the United States Patent and Trademark Office for corresponding U.S. Appl. No. 16/898,926, electronically delivered on Oct. 21, 2022.
Final Office Action issued by the United States Patent and Trademark Office for corresponding U.S. Appl. No. 16/898,926, electronically delivered on Mar. 28, 2023.
Advisory Office Action issued by the United States Patent and Trademark Office for corresponding U.S. Appl. No. 16/898,926, electronically delivered on Jun. 27, 2023.
Notice of Allowance issued by the United States Patent and Trademark Office for corresponding U.S. Appl. No. 16/898,926, electronically delivered on Oct. 27, 2023.

\* cited by examiner

SIGNAL RECEPTION APPARATUS AND METHOD AND COMMUNICATIONS SYSTEM

CROSS REFERENCE TO RELATED APPLICATIONS

This application is a divisional application of U.S. utility application Ser. No. 16/898,926 filed on Jun. 11, 2020, which is a continuation U.S. application of International Application No. PCT/CN2018/072294, filed on Jan. 11, 2018, the contents of each are incorporated herein by reference.

TECHNICAL FIELD

This disclosure relates to the field of communications, and in particular to a signal reception apparatus and method and a communications system.

BACKGROUND

The massive multiple-input multiple-output (MIMO) technique is a key technique for new radio (NR) systems, and includes research on frequency bands below 6 GHz and above 6 GHz. As transmission frequency bands increase, fading and loss generated during transmission will increase accordingly. The beamforming technique has become a key technique in the massive MIMO because it is able to effectively compensate for fading.

In the research of NR, in order to improve the reliability of transmission, the beamforming technique in which multiple beams are transmitted simultaneously for physical channels (such as broadcast channels, data channels, and control channels) is allowed. Since both a network device and a terminal equipment (TE) have abilities to transmit and receive multiple beams, optimal combination of transmission and reception beams may be obtained through beam management, such as performing beam sweeping respectively at a receiver end and a transmitter end.

For example, downlink beam management in an NR system in the current 3GPP (3rd Generation Partnership Project) includes three processes:

process 1 (P1): a network device transmits multiple different beams, and a terminal equipment measures the beams and selects transmission beams of better quality;

process 2 (P2): the network device transmits multiple different beams; compared with process 1, the beams of the time domain resources in process 2 are finer (narrow), which may be a smaller set of beams of the time domain resource in process 1; and the terminal equipment measures the beams and selects transmission beams of better quality; and process 3 (P3): the network device transmits multiple identical beams, and the terminal equipment receives by using different reception beams, thereby selecting reception beams of better quality.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

Through the three processes of beam management, the terminal equipment may obtain quality of the beam pair links (BPLs) of combinations of multiple different beams of the transmitter end and multiple different beams of the receiver end. An existing NR system supports reporting of the beam quality of multiple transmitter ends by the terminal equipment side. For example, indices of beams of better quality and corresponding reference signal received power (RSRP) are reported to the network device, such as reporting indices of beams of better quality represented by using indices of resources of channel state information reference signals (CSI-RSs) and/or indices of times of synchronization signal/physical broadcast channel (PBCH) blocks and corresponding RSRP to the network device.

After the network device obtains the beams of better quality reported by the terminal equipment, these beams may be used in transmission of the physical channels (broadcast channels, data channels, and control channels, etc.) to obtain higher transmission quality. And the NR supports the network device to indicate used transmission beams to the terminal equipment, so as to facilitate the terminal equipment to decide to use which reception beam to align reception. The beam indication may also be referred to as a spatial quasi-co-location (QCL) indication or an indication of a transmission configuration indication (TCI) state.

It was found by the inventors that although the NR supports the network device to indicate the used transmission beams to the terminal equipment, the reception beams used by the terminal equipment may be different at different time periods (different time-domain resources) of receiving signals by the terminal equipment. As the boundary of these time-domain resources when the terminal equipment actually receives signals may be indefinite, at certain times, the network device assumes that the reception beams used by the terminal equipment and reception beams actually used by the terminal equipment may possibly be different, which will result in mismatch between transmission and reception beams of the network equipment and the terminal equipment, causing a loss of transmission reliability of the system.

Embodiments of this disclosure provide a signal reception apparatus and method and a communications system, in which as a starting position of a time domain resource section used for receiving signals is determined according to a predefined or preconfigured reference time domain resource section, time domain resources on which receiving beams determined by a network device and a terminal equipment are based are uniform, thereby avoiding mismatch of the network device and the terminal equipment in receiving and transmitting beams and ensuring transmission reliability of the system.

According to a first aspect of the embodiments of this disclosure, there is provided a signal reception apparatus, including: a first receiving unit configured to receive a first signal containing first control information at a first time domain resource section based on an assumption that a network device uses a first transmission configuration indication (TCI) state; and a second receiving unit configured to receive a second signal at a second time domain resource section based on an assumption that the network device uses a second transmission configuration indication state, a starting position of the second time domain resource section being determined according to a reference time domain resource section, the reference time domain resource section being related to the first control information, and the reference time domain resource section being predefined or preconfigured.

According to a second aspect of the embodiments of this disclosure, there is provided a signal reception apparatus, including: a first setting unit configured to, when a time interval between a time domain resource unit of a received signal and a reference time domain resource section is greater than a threshold, and in a case where received control information does not indicate that the time domain resource unit is used for transmission of the received signal, set transmission configuration indication (TCI) state indication of the time domain resource unit to be having no beam information corresponding to the received signal; wherein, the reference time domain resource section is related to the control information, and the reference time domain resource section is predefined or preconfigured.

According to a third aspect of the embodiments of this disclosure, there is provided a terminal equipment, including the apparatus as described in the first or the second aspect.

According to a fourth aspect of the embodiments of this disclosure, there is provided a communications system, including a network device and the terminal equipment as described in the third aspect.

According to a fifth aspect of the embodiments of this disclosure, there is provided a signal reception method, including: receiving a first signal containing first control information at a first time domain resource section based on an assumption that a network device uses a first transmission configuration indication (TCI) state; and receiving a second signal at a second time domain resource section based on an assumption that the network device uses a second transmission configuration indication state, a starting position of the second time domain resource section being determined according to a reference time domain resource section, the reference time domain resource section being related to the first control information, and the reference time domain resource section being predefined or preconfigured.

According to a sixth aspect of the embodiments of this disclosure, there is provided a signal reception method, including: when a time interval between a time domain resource unit of a received signal and a reference time domain resource section is greater than a threshold, and in a case where received control information does not indicate that the time domain resource unit is used for transmission of the received signal, set transmission configuration indication (TCI) state indication of the time domain resource unit to be having no beam information corresponding to the received signal; wherein, the reference time domain resource section is related to the control information, and the reference time domain resource section is predefined or preconfigured.

According to a seventh aspect of the embodiments of this disclosure, there is provided a computer readable program, which, when executed in a signal reception apparatus or a terminal equipment, will cause the signal reception apparatus or the terminal equipment to carry out the signal reception method as described in the fifth or sixth aspect of the embodiments of this disclosure.

According to an eighth aspect of the embodiments of this disclosure, there is provided a computer storage medium, including a computer readable program code, which will cause a signal reception apparatus or a terminal equipment to carry out the signal reception method as described in the fifth or sixth aspect of the embodiments of this disclosure.

An advantage of the embodiments of this disclosure exists in that as the starting position of the time domain resource section used for receiving signals is determined according to the predefined or preconfigured reference time domain resource section, time domain resources on which receiving beams determined by the network device and the terminal equipment are based are uniform, thereby avoiding mismatch of the network device and the terminal equipment in receiving and transmitting beams and ensuring transmission reliability of the system.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
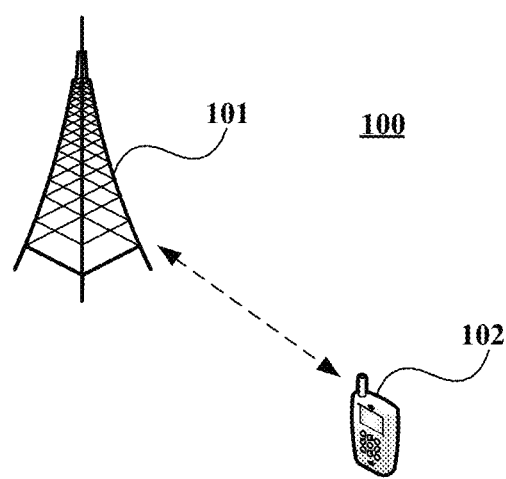
FIG. 1 is a schematic diagram of a communications system of embodiments of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communications network" or "wireless communications network" may refer to a network satisfying any one of the following communications standards: long term evolution (LTE), long term evolution-advanced (LTE-A), wideband code division multiple access (WCDMA), and high-speed packet access (HSPA), etc.

And communications between devices in a communications system may be performed according to communications protocols at any stage, which may, for example, include but not limited to the following communications protocols: 1G (generation), 2G, 2.5G, 2.75G, 3G, 4G, 4.5G, and 5G and new radio (NR) in the future, and/or other communications protocols that are currently known or will be developed in the future.

In the embodiments of this disclosure, the term "network device", for example, refers to an equipment in a communications system that accesses a terminal equipment to the communications network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC).

For example, the base station may include but not limited to a node B (NodeB or NB), an evolved node B (eNodeB or eNB), and a 5G base station (gNB). Furthermore, it may include a remote radio head (RRH), a remote radio unit (RRU), a relay, or a low-power node (such as a femto, and a pico). The term "base station" may include some or all of its functions, and each base station may provide communications coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communications network and receiving network services via a network device. The user equipment may be fixed or mobile, and may also be referred to as a mobile station (MS), a terminal, a subscriber station (SS), an access terminal (AT), or a station, etc.

For example, the user equipment may include but not limited to the following devices: a cellular phone, a personal digital assistant (PDA), a wireless modem, a wireless communications device, a hand-held device, a machine-type communications device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communications (MTC) terminal, a vehicle mounted communications terminal, a device to device (D2D) terminal, and a machine to machine (M2M) terminal.

A control channel (CCH) is used to transmit control signaling, and a physical downlink control channel (PDCCH) is one of common control channels, which is used to carry scheduling and other control information. In the embodiments of this disclosure, description shall be given by taking an NR system PDCCH (NR-PDCCH) as an example; however, the embodiments of this disclosure are not limited thereto.

A data channel is used to transmit data, and a physical downlink shared channel (PDSCH) is one of common control channels, which is used to carry communications data. In the embodiments of this disclosure, description shall be given by taking an NR system PDSCH (NR-PDSCH) as an example; however, the embodiments of this disclosure are not limited thereto.

In the embodiments of this disclosure, indication of a transmission configuration indication (TCI) state may be equivalent to a spatial quasi-co-location (QCL) indication or a beam indication, the TCI state representing information related to a used beam, such as an index of the beam number, and a transmission parameter; however, the embodiments of this disclosure are not limited thereto.

In the embodiments of this disclosure, "a time domain resource unit" is a unit for measuring a time domain resource; for example, "the time domain resource unit" is a time domain symbol, or a slot, or a subframe.

In the embodiments of this disclosure, "a time domain resource section" refers to a section of a time domain resource that may be measured by using a time domain resource unit (a time domain resource within an interval).

Scenarios in the embodiments of this disclosure shall be described below by way of examples; however, this disclosure is not limited thereto.

In the embodiments of this disclosure, a serving network device and a collaborative network device are relative to a terminal equipment. For example, when a communications system includes multiple terminal equipments, a certain network device is a serving network device for a terminal equipment therein, and may be a cooperative network device for another terminal equipment.

FIG. 1 is a schematic diagram of a communications system of embodiments of this disclosure, in which a case where a terminal equipment and a network device are taken as examples is schematically shown. As shown in FIG. 1, a communications system 100 may include a network device 101 and a terminal equipment 102. An example having one network device and one terminal equipment is schematically given in FIG. 1. However, network devices and terminal equipments may also be multiple, and the numbers thereof may be set as actually demanded.

In the embodiment of this disclosure, existing traffics or traffics that may be implemented in the future may be performed between the network device 101 and the terminal equipment 102. For example, such traffics may include but not limited to an enhanced mobile broadband (eMBB), massive machine type communications (MTC), and ultra-reliable and low-latency communications (URLLC).

First Embodiment

Figure 2:
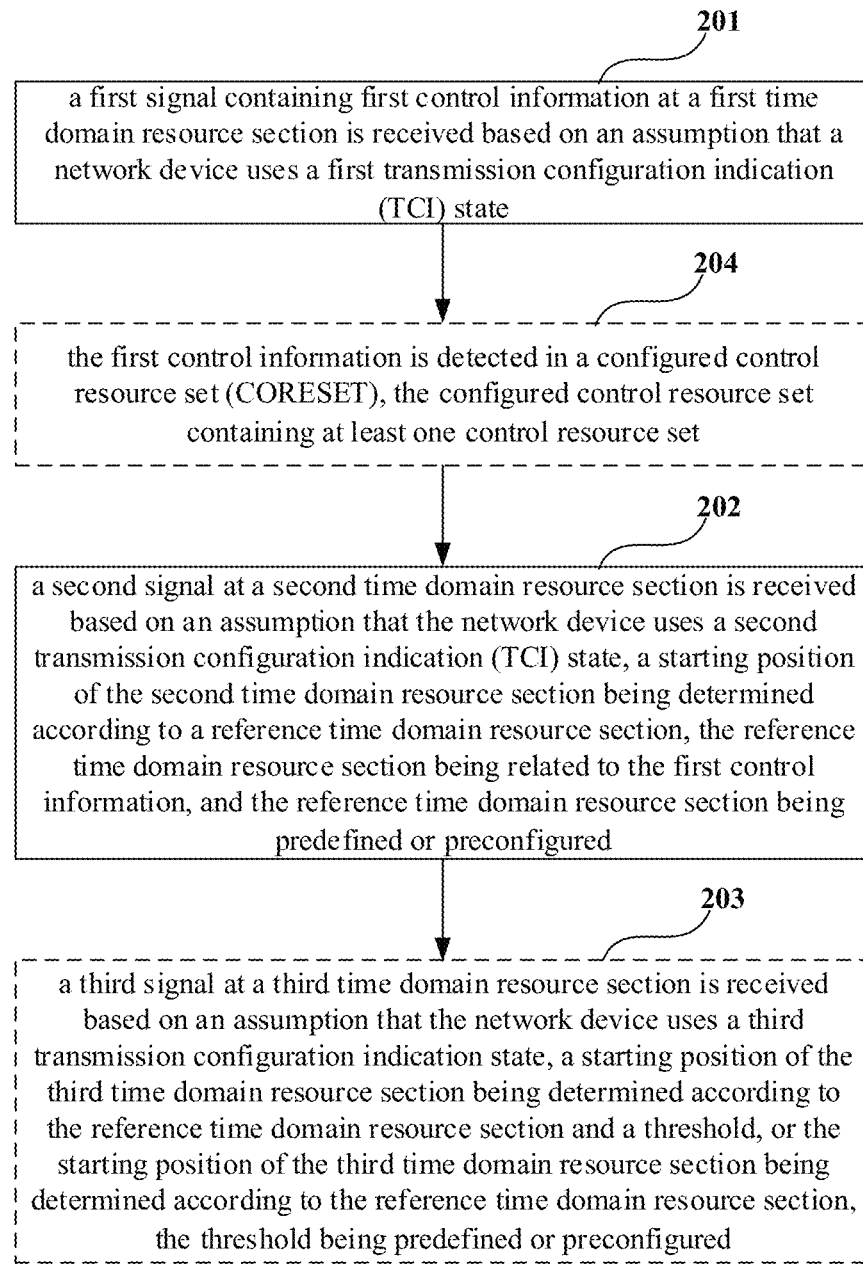
FIG. 2 is a schematic diagram of the signal reception method of the first embodiment of this disclosure.

A first embodiment of this disclosure provides a signal reception method, applicable to a terminal equipment side. FIG. 2 is a schematic diagram of the signal reception method of the first embodiment of this disclosure. As shown in FIG. 2, the method includes:

Step 201: a first signal containing first control information at a first time domain resource section is received based on an assumption that a network device uses a first transmission configuration indication (TCI) state; and Step 202: a second signal at a second time domain resource section is received based on an assumption that the network device uses a second transmission configuration indication (TCI) state, a starting position of the second time domain resource section being determined according to a reference time domain resource section, the reference time domain resource section being related to the first control information, and the reference time domain resource section being predefined or preconfigured.

It can be seen from the above embodiment that as the starting position of the time domain resource section used for receiving signals is determined according to the predefined or preconfigured reference time domain resource section, time domain resources on which receiving beams determined by the network device and the terminal equipment are based are uniform, thereby avoiding mismatch of the network device and the terminal equipment in receiving and transmitting beams and ensuring transmission reliability of the system.

In this embodiment, the method may further include:

Step 203: a third signal at a third time domain resource section is received based on an assumption that the network device uses a third transmission configuration indication state, a starting position of the third time domain resource section being determined according to the reference time domain resource section and a threshold, or the starting position of the third time domain resource section being determined according to the reference time domain resource section, the threshold being predefined or preconfigured.

In this embodiment, step 203 is optional.

In this embodiment, the first time domain resource section may include at least one time domain resource unit, the second time domain resource section may include at least one time domain resource unit, and the third time domain resource section may include at least one time domain resource unit.

In this embodiment, the time domain resource unit is a time domain symbol, or a slot, or a subframe. For example, the time domain resource unit is an OFDM (orthogonal frequency division multiplexing) symbol.

In this embodiment, the first time domain resource section, the second time domain resource section and the third time domain resource section may be sequentially arranged on the time axis, that is, the terminal equipment sequentially receives the first control information containing the first control information, the second signal and the third signal.

In this embodiment, the first time domain resource section and the second time domain resource section may be continuous, or may be spaced, or may be partially overlapped. And the first time domain resource section, the second time domain resource section and the third time domain resource section may be continuous, spaced, or partially overlapped, in a two by two manner.

A relationship between the first time domain resource section and the second time domain resource section on the time axis and a relationship between the first time domain resource section, the second time domain resource section and the third time domain resource section on the time axis shall be exemplified below.

Figure 3:
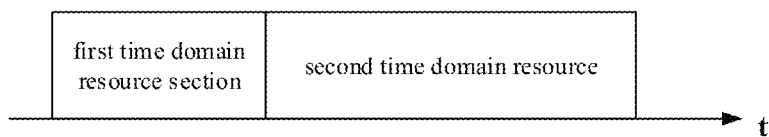
FIG. 3 is a schematic diagram of the first time domain resource section and the second time domain resource section of the first embodiment of this disclosure.

FIG. 3 is a schematic diagram of the first time domain resource section and the second time domain resource section of the first embodiment of this disclosure. As shown in FIG. 3, the first time domain resource section and the second time domain resource section are sequentially arranged on the time axis, and the second time domain resource section is immediately after the first time domain resource section.

Figure 4:
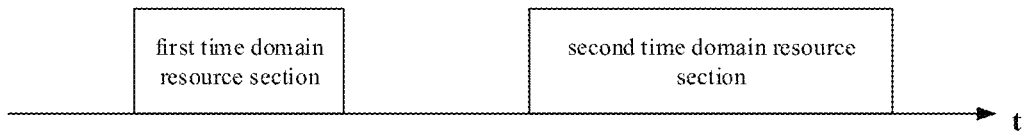
FIG. 4 is another schematic diagram of the first time domain resource section and the second time domain resource section of the first embodiment of this disclosure.

FIG. 4 is another schematic diagram of the first time domain resource section and the second time domain resource section of the first embodiment of this disclosure. As shown in FIG. 4, the first time domain resource section and the second time domain resource section are sequentially arranged on the time axis, and there is an interval between the second time domain resource section and the first time domain resource section.

Figure 5:
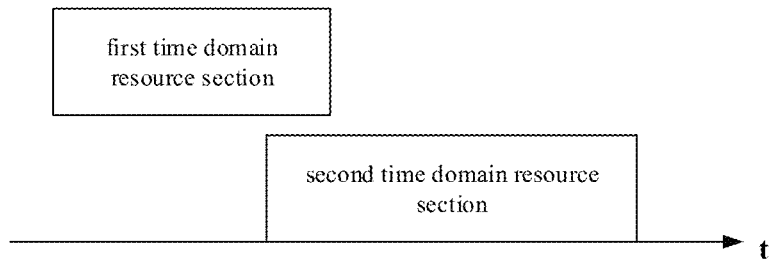
FIG. 5 is a further schematic diagram of the first time domain resource section and the second time domain resource section of the first embodiment of this disclosure.

FIG. 5 is a further schematic diagram of the first time domain resource section and the second time domain resource section of the first embodiment of this disclosure. As shown in FIG. 5, the second time domain resource section and the first time domain resource section partially overlap in the time domain.

Figure 6:
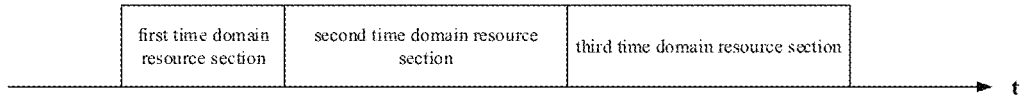
FIG. 6 is a schematic diagram of the first time domain resource section, the second time domain resource section and the third time domain resource section of the first embodiment of this disclosure.
Figure 7:
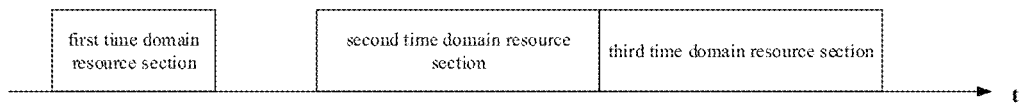
FIG. 7 is another schematic diagram of the first time domain resource section, the second time domain resource section and the third time domain resource section of the first embodiment of this disclosure.

FIG. 6 is a schematic diagram of the first time domain resource section, the second time domain resource section and the third time domain resource section of the first embodiment of this disclosure. As shown in FIG. 6, the first time domain resource section, the second time domain resource section and the third time domain resource section are sequentially arranged on the time axis, the second time domain resource section is immediately after the first time domain resource section, and the third time domain resource section is immediately after the second time domain resource section. FIG. 7 is another schematic diagram of the first time domain resource section, the second time domain resource section and the third time domain resource section of the first embodiment of this disclosure. As shown in FIG. 7, the first time domain resource section, the second time domain resource section and the third time domain resource section are sequentially arranged on the time axis, there is an interval between the second time domain resource section and the first time domain resource section, and the third time domain resource section is immediately after the second time domain resource section.

Figure 8:
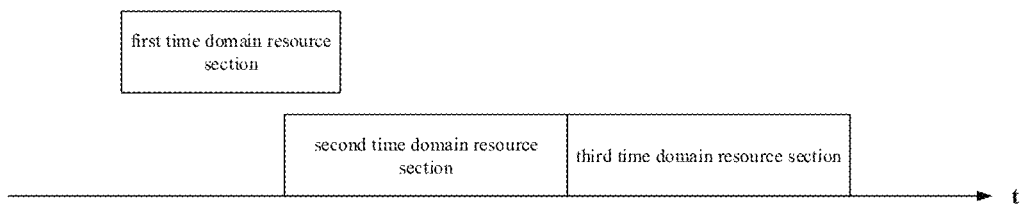
FIG. 8 is a further schematic diagram of the first time domain resource section, the second time domain resource section and the third time domain resource section of the first embodiment of this disclosure.

FIG. 8 is a further schematic diagram of the first time domain resource section, the second time domain resource section and the third time domain resource section according to the first embodiment of this disclosure. As shown in FIG. 8, the second time domain resource section and the first time domain resource section partially overlap in the time domain, and the third time domain resource section is immediately after the second time domain resource section.

Figure 9:
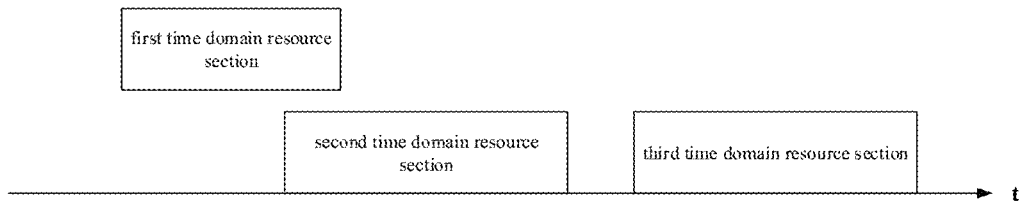
FIG. 9 is yet another schematic diagram of the first time domain resource section, the second time domain resource section and the third time domain resource section of the first embodiment of this disclosure.

FIG. 9 is yet another schematic diagram of the first time domain resource section, the second time domain resource section and the third time domain resource section of the first embodiment of this disclosure. As shown in FIG. 9, the second time domain resource section and the first time domain resource section partially overlap in the time domain, and there is an interval between the third time domain resource section and the second time domain resource section.

Figure 10:
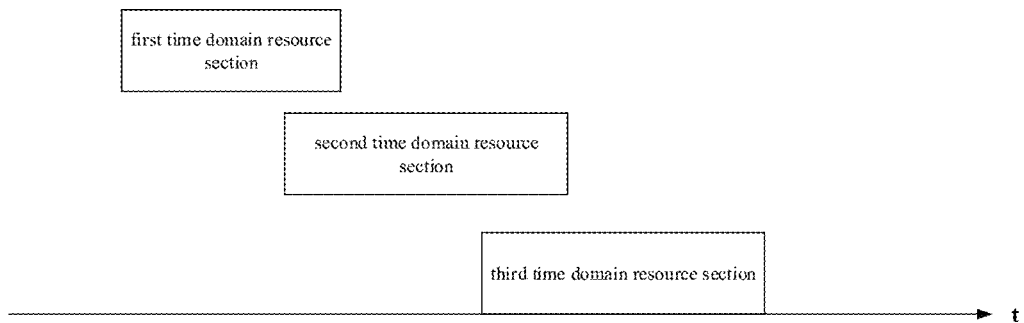
FIG. 10 is still another schematic diagram of the first time domain resource section, the second time domain resource section and the third time domain resource section of the first embodiment of this disclosure.

FIG. 10 is still another schematic diagram of the first time domain resource section, the second time domain resource section and the third time domain resource section of the first embodiment of this disclosure. As shown in FIG. 10, the second time domain resource section and the first time domain resource section partially overlap in the time domain, and the third time domain resource section and the second time domain resource section partially overlap in the time domain.

Figure 11:
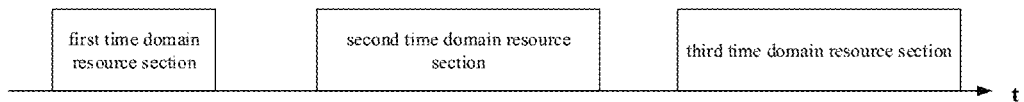
FIG. 11 is yet still another schematic diagram of the first time domain resource section, the second time domain resource section and the third time domain resource section of the first embodiment of this disclosure.

FIG. 11 is yet still another schematic diagram of the first time domain resource section, the second time domain resource section and the third time domain resource section of the first embodiment of this disclosure. As shown in FIG. 11, the first time domain resource section, the second time domain resource section and the third time domain resource section are sequentially arranged on the time axis, there is an interval between the second time domain resource section and the first time domain resource section, and there is an interval between the third time domain resource section and the second time domain resource section.

In this embodiment, lengths of the first time domain resource section, the second time domain resource section and the third time domain resource section may be determined according to an actual situation, such as being determined according to types and/or data amounts of signals received respectively during the first time domain resource section, the second time domain resource section and the third time domain resource section.

For example, a first signal received by the terminal equipment at the first time domain resource section is a control channel; for example, the first signal is a physical downlink control channel (PDCCH), and first control information contained therein is downlink control information (DCI).

For example, a second signal received by the terminal equipment at the second time domain resource section is a first data channel; and for example, the second signal is a first physical downlink shared channel (PDSCH).

For example, a third signal received by the terminal equipment at the third time domain resource section is a second data channel; and for example, the third signal is a second physical downlink shared channel (PDSCH).

In this embodiment, for example, the first control information in the first signal is used to indicate the terminal equipment to receive the first data channel and/or the second data channel.

In this embodiment, the second signal may further include second control information, such as multi-step or multi-level control information. And the first control information may further be used to indicate a transmission parameter of the second control information.

For example, the transmission parameter includes at least one of the following parameters: channel coding, a coding rate, a modulation mode, a time-frequency resource position, and a transmission configuration indication state.

In this embodiment, the first data channel and the second data channel may be identical or different.

For example, in this embodiment, the first data channel and the second data channel being identical refers to that the first data channel and the second data channel correspond to two parts of the same data channel of the same information block (a transport block), and the first data channel and the second data channel being different refers to that the first data channel and the second data channel are different data channels, which respectively correspond to two information blocks.

In steps 201 and 202, the first signal containing the first control information is received at the first time domain resource section based on the assumption that the network device uses a first TCI state, and the second signal is received at the second time domain resource section based on the assumption that the network device uses a second TCI state.

For example, a PDCCH containing DCI is received at the first time domain resource section based on the assumption that the network device uses the first TCI state, and a first PDSCH is received at the second time domain resource section based on the assumption that the network device uses the second TCI state.

In this embodiment, the assumption based on that the network device uses the first TCI state and the assumption based on that the network device uses the second TCI state refer to that the terminal equipment deems that the network device transmits the first signal by using a beam denoted by the first TCI state, and the terminal equipment deems that the network device transmits the second signal by using a beam denoted by the second TCI state. Furthermore, the assumption based on that the network device uses a third transmission configuration indication state refers to that the terminal equipment deems that the network device transmits the third signal by using a beam denoted by the third TCI state.

In this embodiment, the first TCI state and the second TCI state may be identical or different.

In this embodiment, the second TCI state and the third TCI state may be identical or different.

In this embodiment, the first TCI state may contain at least one TCI state, the second TCI state may contain at least one TCI state, and the third TCI state may contain at least one TCI state.

In this embodiment, the starting position of the second time domain resource section is determined according to the reference time domain resource section, the reference time domain resource section being predefined or pre-configured. In this way, both the network device and the terminal equipment may definitely obtain a time domain resource unit at which reception and transmission of the second signal are started, hence, reception beams determined by the network device and the terminal equipment for receiving the second signal are in identical TCI states.

In this embodiment, that the reference time domain resource section is predefined or preconfigured refer to that the reference time domain resource section is a predefined time domain resource unit, or the reference time domain resource section is a time domain resource unit preconfigured by a higher layer.

A method for determining the reference time domain resource section shall be exemplarily described below.

In this embodiment, the reference time domain resource section may be related to the first control information. For example, that the reference time domain resource section is related to the first control information refers to that the reference time domain resource section is related to a control resource used for the first control information, and is not related to an actual reception time of the first control information.

For example, the method may further include:

Step 204: the first control information is detected in a configured control resource set (CORESET), the configured control resource set including at least one control resource set.

In this embodiment, step 204 is optional.

In this embodiment, the reference time domain resource section may be a time domain resource unit at a specific position on a time axis in the configured control resource set.

For example, a time domain resource occupied by the configured CORESET includes three OFDM symbols, and the reference time domain resource section may be a first OFDM symbol, or may be a second OFDM symbol, or may be a third OFDM symbol.

In this embodiment, the reference time domain resource section may be a time domain resource unit at a last position on a time axis in the configured control resource set, or a time domain resource unit next to the configured control resource set on a time axis.

For example, a time domain resource occupied by the configured CORESET includes three OFDM symbols, and the reference time domain resource section may be a third OFDM symbol, or may be a next OFDM symbol next to the CORESET.

In this embodiment, the reference time domain resource section may be a time domain resource unit of a resource in the configured control resource set where a search space set is located at an earliest position on a time axis, the configured control resource set containing at least one search space set.

For example, the configured CORESET contains 4 search space sets, first OFDMs to be monitored indicated by monitoring patterns in the 4 search space sets are 1, 1, 2, 0, respectively, and the reference time domain resource section may be a symbol 0, i.e. a first OFDM symbol.

In this embodiment, the reference time domain resource section may be a time domain resource unit at a last position of a resource where a search space set in the configured control resource set is located on a time axis, or a time domain resource unit next to the resource where a search space set in the configured control resource set is located on a time axis.

For example, the configured CORESET contains 4 search space sets, last OFDMs to be monitored indicated by monitoring patterns in the 4 search space sets are 1, 2, 0, 2, respectively, and the reference time domain resource section may be a symbol 2, i.e., a third OFDM symbol, or may be a symbol 3, i.e., an OFDM symbol next to the third OFDM symbol.

In this embodiment, the reference time domain resource section may also be a time domain resource section at a specific position in the control resource set where the first control information is located.

Figure 12:
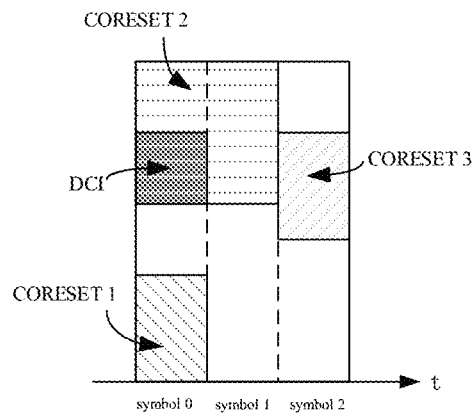
FIG. 12 is a schematic diagram of the CORESET and the control information of the first embodiment of this disclosure.

FIG. 12 is a schematic diagram of the CORESET and the control information of the first embodiment of this disclosure. As shown in FIG. 12, the CORESET where the first control information (such as DCI) is located is a CORESET 2, and the CORESET 2 occupies 2 OFDM symbols, the reference time domain resource section may be a first OFDM symbol (a symbol 0), and may also be a second OFDM symbol (a symbol 1).

In this embodiment, the reference time domain resource section may also be a time domain resource section located at a last position on the time axis in the control resource set where the first control information is located, or a time domain resource section on the time axis next to the control resource set where the first control information is located.

For example, the CORESET where the first control information is located occupies 2 OFDM symbols, and the reference time domain resource section may be a second OFDM symbol, or may be an OFDM symbol next to the CORESET.

In this embodiment, the reference time domain resource section may also be a time domain resource unit of a resource where a search space set is located at an earliest position on the time axis, the search space set being in the control resource set where the first control information is located.

For example, the CORESET where the first control information is located has four search space sets, a first OFDM symbol to be monitored indicated in a monitoring pattern of the search space set where the first control information is located is a symbol 1, and the reference time domain resource section may be the symbol 1, i.e. a second OFDM symbol.

In this embodiment, the reference time domain resource section may also be a time domain resource unit of a resource where a search space set is located at a last position on the time axis, or a time domain resource unit next to a resource where a search space set is located, the search space set being in the control resource set where the first control information is located.

For example, the CORESET where the first control information is located has 4 search space sets, and a first OFDM symbol to be monitored indicated in a monitoring pattern of a search space set where the first control information is located and the relevant configuration of a CORESET where it is located jointly determine that a last OFDM symbol to be monitored is a symbol 2, then the reference time domain resource section may be a symbol 2, i.e. a third OFDM symbol, or an OFDM symbol next to the third OFDM symbol.

In this embodiment, the reference time domain resource section may also be a first, or a second, or a third time domain symbol in a scheduling unit where the first control information is located, the scheduling unit including a slot or at least one symbol.

In this embodiment, the starting position of the second time domain resource section is determined according to the reference time domain resource section.

For example, the second time domain resource section starts from the reference time domain resource section; or, the second time domain resource section starts from a time domain resource unit next to the reference time domain resource section; or, the second time domain resource section starts from an N-th time domain resource unit after the reference time domain resource section, N being indicated by the first control information, and N being a natural number.

Figure 13:
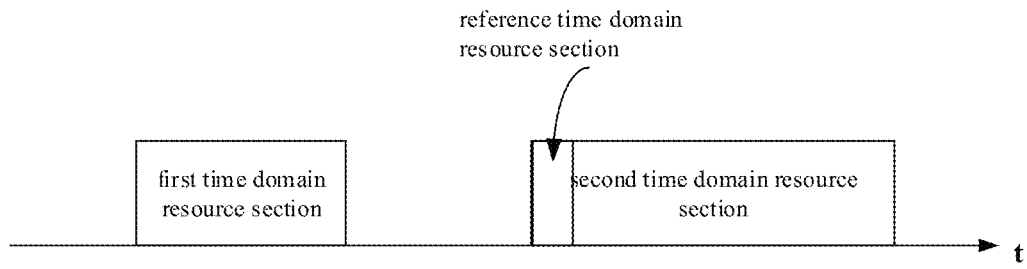
FIG. 13 is a schematic diagram of the first time domain resource section, the second time domain resource section and the reference time domain resource section of the first embodiment of this disclosure.

FIG. 13 is a schematic diagram of the first time domain resource section, the second time domain resource section and the reference time domain resource section of the first embodiment of this disclosure. As shown in FIG. 13, the second time domain resource section starts from the reference time domain resource section.

In step 203, the third signal is received at the third time domain resource section based on the assumption that the network device uses the third transmission configuration indication state, the starting position of the third time domain resource section being determined according to the reference time domain resource section and the threshold, or the starting position of the third time domain resource section being determined according to the reference time domain resource section, the threshold being predefined or preconfigured.

In this embodiment, the third time domain resource section may start from an M-th time domain resource unit after the reference time domain resource section, M being equal to the threshold, and M being a natural number; or, the third time domain resource section may start from an S-th time domain resource unit after the reference time domain resource section, S being indicated by the first control information, and S being a natural number.

In this embodiment, the threshold may be set according to an actual situation, such as being determined according to a demodulation time of the terminal equipment.

Figure 14:
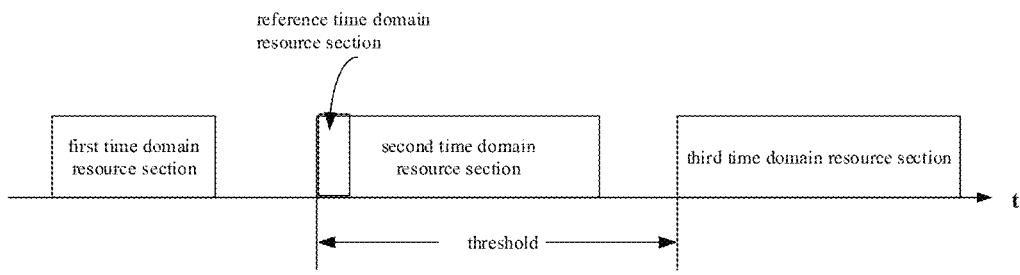
FIG. 14 is a schematic diagram of the first time domain resource section, the second time domain resource section and the third time domain resource section of the first embodiment of this disclosure.

FIG. 14 is a schematic diagram of the first time domain resource section, the second time domain resource section and the third time domain resource section of the first embodiment of this disclosure. As shown in FIG. 14, the second time domain resource section starts from the reference time domain resource section, and the third time domain resource section starts from the M-th time domain resource unit after the reference time domain resource section, M being equal to the threshold.

In this embodiment, the terminal equipment may also receive a fourth signal at a fourth time domain resource section based on an assumption that the network device uses a fourth transmission configuration indication state, or may further receive more signals at more time domain resource sections based on an assumption that the network device uses more transmission configuration indication states, starting positions of these time domain resource sections being also determined according to the reference time domain resource section, and a particular determination method being similar to above method, which shall not be described herein any further.

It can be seen from the above embodiment that as the starting position of the time domain resource section used for receiving signals is determined according to the predefined or preconfigured reference time domain resource section, time domain resources on which receiving beams determined by the network device and the terminal equipment are based are uniform, thereby avoiding mismatch of the network device and the terminal equipment in receiving and transmitting beams and ensuring transmission reliability of the system.

Second Embodiment

This embodiment of this disclosure provides a signal reception method, applicable to a terminal equipment side.

Figure 15:
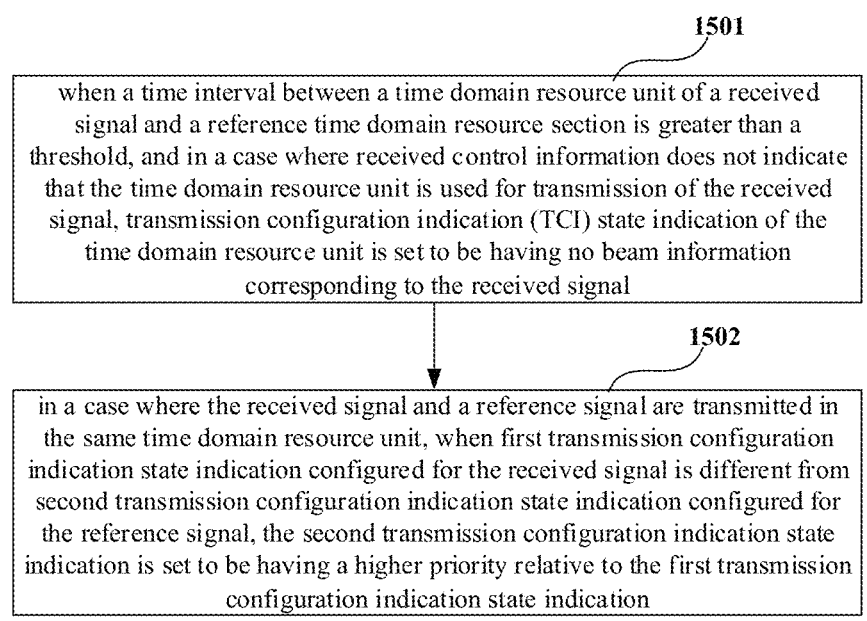
FIG. 15 is a schematic diagram of the signal reception method of the second embodiment of this disclosure.

FIG. 15 is a schematic diagram of the signal reception method of the second embodiment of this disclosure. As shown in FIG. 15, the method includes:

Step 1501: when a time interval between a time domain resource unit of a received signal and a reference time domain resource section is greater than a threshold, and in a case where received control information does not indicate that the time domain resource unit is used for transmission of the received signal, transmission configuration indication (TCI) state indication of the time domain resource unit is set to be having no beam information corresponding to the received signal;

In this embodiment, the reference time domain resource section is related to the control information, and the reference time domain resource section is predefined or preconfigured.

In this embodiment, the received signal may be a data channel, for example, the received signal is a physical downlink shared channel (PDSCH).

In this embodiment, a method for determining the reference time domain resource section may be identical to the method in the first embodiment, which shall not be described herein any further.

In this embodiment, a method for determining the threshold may be identical to the method in the first embodiment, which shall not be described herein any further.

In this embodiment, the time domain resource unit may be a time domain symbol, or a slot, or a subframe; for example, the time domain resource unit is an OFDM symbol.

In this embodiment, when the time interval between the time domain resource unit of the received signal and the reference time domain resource section is greater than the threshold, and in the case where the received control information does not indicate that the time domain resource unit is used for the transmission of the received signal, the TCJ indication of the time domain resource unit is configured to have no beam information corresponding to the received signal. In this way, it is able to avoid receiving a signal transmitted by the network device by using an original assumption of a TCJ state and avoid energy loss.

In this embodiment, the method may further include:

Step 1502: in a case where the received signal and a reference signal are transmitted in the same time domain resource unit, when first transmission configuration indication state indication configured for the received signal is different from second transmission configuration indication state indication configured for the reference signal, the second transmission configuration indication state indication is set to be having a higher priority relative to the first transmission configuration indication state indication.

In this embodiment, the reference signal is, for example, a channel state information reference signal (CSI-RS), or a tracking reference signal (TRS), or a synchronization signal/physical broadcast channel block (SS/PBCH block), or another reference signal. In this way, setting the priority of the reference signal beam indication to be higher than that of the received signal is helpful to ensure correct demodulation of the reference signal.

In this embodiment, the priority may also be defined according to a time domain transmission characteristic of the reference signal. For example, a priority of a transmission configuration indication state of an aperiodic CSI-RS is set to be higher than that of the first transmission configuration indication state, and a priority of a transmission configuration indication state of a periodic CSI-RS is set to be lower than that of the first transmission configuration indication state.

In this embodiment, for a certain slot, when there exists only one type of search space set (such as common search space set or a UE-specific search space set), in a case where there exist TCI state indication and a default TCI state on the same OFDM symbol, for example, the former comes from cross-slot scheduling of a previous slot, and the latter comes from same slot scheduling of a current slot, the terminal equipment sets the indicated TCI state to be higher than the default TCI state with respect to priority, that is, the terminal equipment assumes that the TCI state on the OFDM symbol is the TCI state indicated in the DCI.

It can be seen from the above embodiment that as the starting position of the time domain resource section used for receiving signals is determined according to the predefined or preconfigured reference time domain resource section, time domain resources on which receiving beams determined by the network device and the terminal equipment are based are uniform, thereby avoiding mismatch of the network device and the terminal equipment in receiving and transmitting beams and ensuring transmission reliability of the system. Furthermore, it is able to avoid receiving a signal transmitted by the network device by using an original assumption of a TCI state and avoid energy loss.

Third Embodiment

This embodiment of this disclosure provides a signal reception apparatus. This apparatus corresponds to the signal reception method described in the first embodiment, and reference may be made to the implementation of method in the first embodiment for implementation of the apparatus, with repeated parts being not going to be described herein any further.

Figure 16:
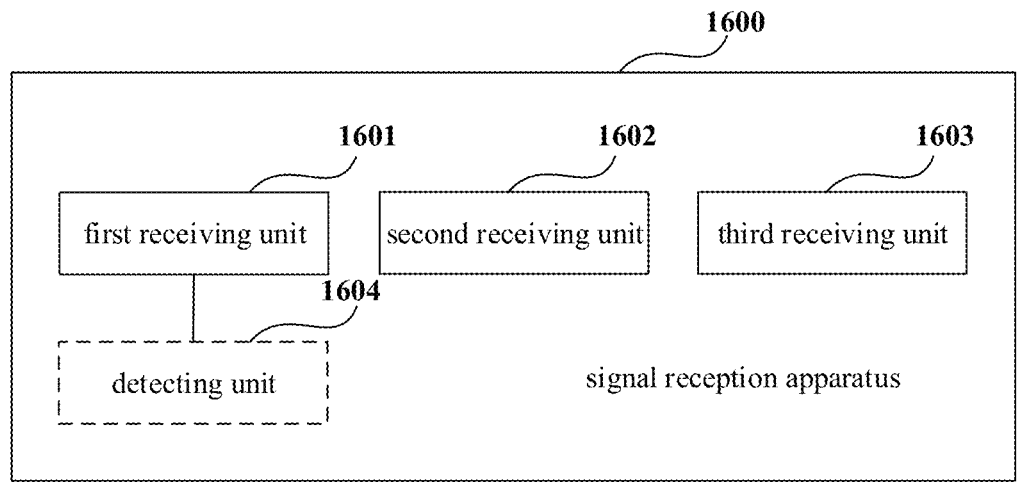
FIG. 16 is a schematic diagram of the signal reception apparatus of the third embodiment of this disclosure.

FIG. 16 is a schematic diagram of the signal reception apparatus of the third embodiment of this disclosure. As shown in FIG. 16, a signal reception apparatus 1600 includes:
  a first receiving unit 1601 configured to receive a first signal containing first control information at a first time domain resource section based on an assumption that a network device uses a first transmission configuration indication (TCI) state; and
  a second receiving unit 1602 configured to receive a second signal at a second time domain resource section based on an assumption that the network device uses a second transmission configuration indication state,
  a starting position of the second time domain resource section being determined according to a reference time domain resource section, the reference time domain resource section being related to the first control information, and the reference time domain resource section being predefined or preconfigured.

In this embodiment, as shown in FIG. 16, the apparatus 1600 may further include:
  a third receiving unit 1603 configured to receive a third signal at a third time domain resource section based on an assumption that the network device uses a third transmission configuration indication state,
  a starting position of the third time domain resource section being determined according to the reference time domain resource section and a threshold, or the starting position of the third time domain resource section being determined according to the reference time domain resource section, the threshold being predefined or preconfigured.

In this embodiment, as shown in FIG. 16, the apparatus 1600 may further include:
  a detecting unit 1604 configured to detect the first control information in a configured control resource set (CORESET), the configured control resource set containing at least one control resource set.

In this embodiment, the third receiving unit 1603 and the detecting unit 1604 are optional.

In this embodiment, methods for determining the reference time domain resource section, the starting position of the second time domain resource section and the starting position of the third time domain resource section are similar to those contained in the first embodiment, and shall not be described herein any further.

It can be seen from the above embodiment that as the starting position of the time domain resource section used for receiving signals is determined according to the predefined or preconfigured reference time domain resource section, time domain resources on which receiving beams determined by the network device and the terminal equipment are based are uniform, thereby avoiding mismatch of the network device and the terminal equipment in receiving and transmitting beams and ensuring transmission reliability of the system. Furthermore, it is able to avoid receiving a signal transmitted by the network device by using an original assumption of a TCI state and avoid energy loss.

Fourth Embodiment

This embodiment of this disclosure provides a signal reception apparatus. This apparatus corresponds to the signal reception method described in the second embodiment, and reference may be made to the implementation of method in the second embodiment for implementation of the apparatus, with repeated parts being not going to be described herein any further.

Figure 17:
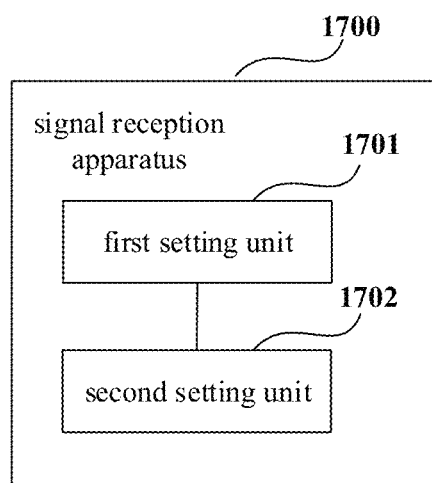
FIG. 17 is a schematic diagram of the signal reception apparatus of the fourth embodiment of this disclosure.

FIG. 17 is a schematic diagram of the signal reception apparatus of the fourth embodiment of this disclosure. As shown in FIG. 17, a signal reception apparatus 1700 includes:
  a first setting unit 1701 configured to, when a time interval between a time domain resource unit of a received signal and a reference time domain resource section is greater than a threshold, and in a case where received control information does not indicate that the time domain resource unit is used for transmission of the received signal, set transmission configuration indication (TCI) state indication of the time domain resource unit to be having no beam information corresponding to the received signal;
  the reference time domain resource section is related to the control information, and the reference time domain resource section is predefined or preconfigured.

In this embodiment, for example, the apparatus 1700 may further include:

a second setting unit 1702 configured to, in a case where the received signal and a reference signal are transmitted in the same time domain resource unit, when first transmission configuration indication state indication configured for the received signal is different from second transmission configuration indication state indication configured for the reference signal, set the second transmission configuration indication state indication to be having a higher priority relative to the first transmission configuration indication state indication.

In this embodiment, the reference signal is, for example, a channel state information reference signal (CSI-RS), or a tracking reference signal (TRS), or a synchronization signal/physical broadcast channel block (SS/PBCH block), or another reference signal. In this way, setting the priority of the reference signal beam indication to be higher than that of the received signal is helpful to ensure correct demodulation of the reference signal.

It can be seen from the above embodiment that as the starting position of the time domain resource section used for receiving signals is determined according to the predefined or preconfigured reference time domain resource section, time domain resources on which receiving beams determined by the network device and the terminal equipment are based are uniform, thereby avoiding mismatch of the network device and the terminal equipment in receiving and transmitting beams and ensuring transmission reliability of the system. Furthermore, it is able to avoid receiving a signal transmitted by the network device by using an original assumption of a TCI state and avoid energy loss.

Fifth Embodiment

This embodiment of this disclosure provides a terminal equipment, including the signal reception apparatus as described in the third or fourth embodiment.

Figure 18:
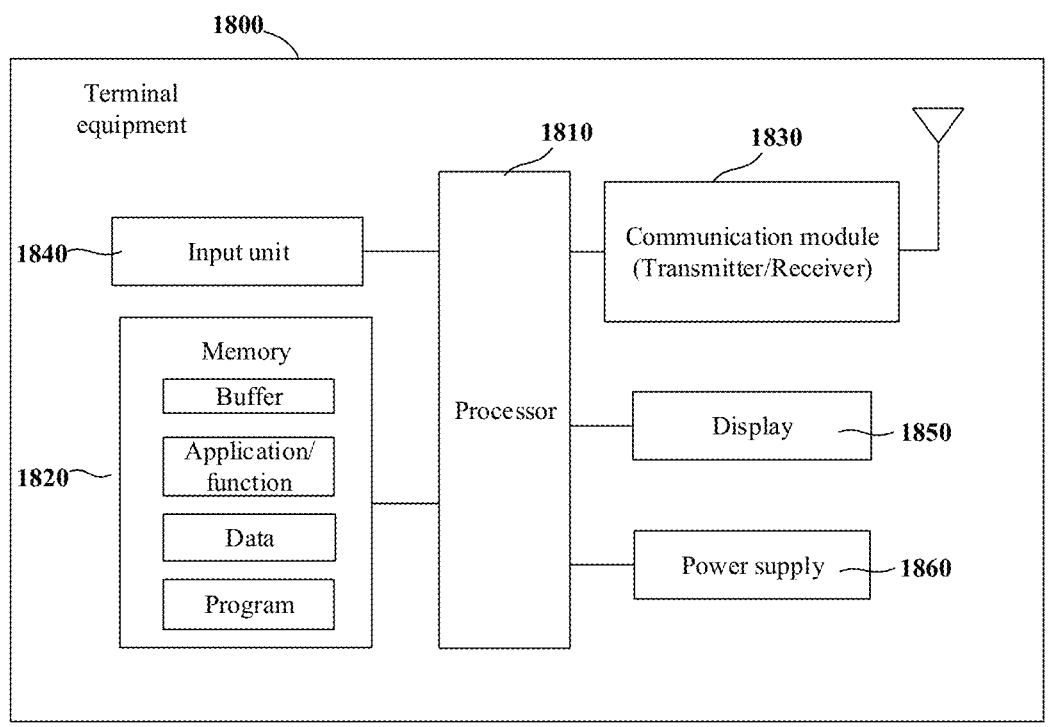
FIG. 18 is a block diagram of a systematic structure of the terminal equipment of the fifth embodiment of this disclosure.

FIG. 18 is a block diagram of a systematic structure of the terminal equipment of the fifth embodiment of this disclosure. As shown in FIG. 18, a terminal equipment 1800 may include a processor 1810 and a memory 1820, the memory 1820 being coupled to the processor 1810. It should be noted that his figure is illustrative only, and other types of structures may also be used, so as to supplement or replace this structure and achieve a telecommunications function or other functions.

In one implementation, the functions of the signal reception apparatus may be integrated into the processor 1810.

The processor 1810 may be configured to: receive a first signal containing first control information at a first time domain resource section based on an assumption that a network device uses a first transmission configuration indication (TCI) state; and receive a second signal at a second time domain resource section based on an assumption that the network device uses a second transmission configuration indication state, a starting position of the second time domain resource section being determined according to a reference time domain resource section, the reference time domain resource section being related to the first control information, and the reference time domain resource section being predefined or preconfigured.

For example, the processor 1810 may further be configured to: receive a third signal at a third time domain resource section based on an assumption that the network device uses a third transmission configuration indication state, a starting position of the third time domain resource section being determined according to the reference time domain resource section and a threshold, or the starting position of the third time domain resource section being determined according to the reference time domain resource section, the threshold being predefined or preconfigured.

For example, the processor 1810 may further be configured to: detect the first control information in a configured control resource set (CORESET), the configured control resource set containing at least one control resource set.

For example, the reference time domain resource section is a time domain resource unit at a last position on a time axis in the configured control resource set, or a time domain resource unit next to the configured control resource set on a time axis.

For example, the reference time domain resource section is a time domain resource unit at a last position of a resource where a search space set in the configured control resource set is located on a time axis, or a time domain resource unit next to the resource where a search space set in the configured control resource set is located on a time axis.

For example, the reference time domain resource section is a time domain resource unit at a last position in a control resource set where the first control information is located on a time axis, or a time domain resource unit next to the control resource set where the first control information is located on a time axis.

For example, the reference time domain resource section is a time domain resource unit at a last position of a resource where a search space set is located on a time axis, the search space set being in the control resource set where the first control information is located, or the reference time domain resource section is a time domain resource unit next to the resource where the search space set is located on a time axis.

For example, the reference time domain resource section is a first time domain symbol, or a second time domain symbol, or a third time domain symbol, in a scheduling unit where the first control information is located, the scheduling unit including a slot or at least one symbol.

For example, the second signal is a first data channel, the first control information being used to indicate a terminal equipment to receive the first data channel, and/or, the third signal is a second data channel, the first control information being used to indicate the terminal equipment to receive the second data channel, and the first data channel and the second data channel being identical or different.

For example, the second signal contains second control information, the first control information being used to indicate a transmission parameter of the second control information, the transmission parameter including at least one of the following: channel coding, a coding rate, a modulation scheme, a time-frequency resource position, and a transmission configuration indication state.

For example, the second time domain resource section starts from the reference time domain resource section, or the second time domain resource section starts from a time domain resource unit next to the reference time domain resource section, or the second time domain resource section starts from an N-th time domain resource unit after the reference time domain resource section, N being indicated by the first control information, and N being a natural number.

For example, the third time domain resource section starts from an M-th time domain resource unit after the reference time domain resource section, M being equal to the threshold, and M being a natural number; or the third time domain resource section starts from an S-th time domain resource unit after the reference time domain resource section, S being indicated by the first control information, and S being a natural number.

For example, the first transmission configuration indication state is identical to or different from the second transmission configuration indication state.

For example, the second transmission configuration indication state is identical to or different from the third transmission configuration indication state.

For example, the first transmission configuration indication state contains at least one transmission configuration indication state, the second transmission configuration indication state contains at least one transmission configuration indication state, and the third transmission configuration indication state contains at least one transmission configuration indication state.

For example, the first time domain resource section contains at least one time domain resource unit, the second time domain resource section contains at least one time domain resource unit, and the third time domain resource section contains at least one time domain resource unit, the time domain resource units being time domain symbols, or slots, or subframes.

In one implementation, the processor 1810 may be configured to: when a time interval between a time domain resource unit of a received signal and a reference time domain resource section is greater than a threshold, and in a case where received control information does not indicate that the time domain resource unit is used for transmission of the received signal, set transmission configuration indication (TCI) state indication of the time domain resource unit to be having no beam information corresponding to the received signal; wherein, the reference time domain resource section is related to the control information, and the reference time domain resource section is predefined or preconfigured.

For example, the processor 1810 may further be configured to: in a case where the received signal and a reference signal are transmitted in the same time domain resource unit, when first transmission configuration indication state indication configured for the received signal is different from second transmission configuration indication state indication configured for the reference signal, set the second transmission configuration indication state indication to be having a higher priority relative to the first transmission configuration indication state indication.

In another implementation, the signal reception apparatus and the processor 1810 may be configured separately. For example, the signal reception apparatus may be configured as a chip connected to the processor 1810, and the functions of the signal reception apparatus are executed under control of the processor 1810.

As shown in FIG. 18, the terminal equipment 1800 may further include a communications module 1830, an input unit 1840, a display 1850, and a power supply 1860. It should be noted that the terminal equipment 1800 does not necessarily include all the parts shown in FIG. 18, and the above components are not necessary. Furthermore, the terminal equipment 1800 may include parts not shown in FIG. 18, and the related art may be referred to.

As shown in FIG. 18, the processor 1810 is sometimes referred to as a controller or control, which may include a microprocessor or other processor devices and/or logic devices, and the processor 1810 receives input and controls operations of every component of the terminal equipment 1800.

The memory 1820 may be, for example, one or more of a buffer memory, a flash memory, a hard drive, a mobile medium, a volatile memory, a nonvolatile memory, or other suitable devices, which may store the information on configuration, etc., and furthermore, store programs executing related information. And the processor 1810 may execute programs stored in the memory 1820, so as to realize information storage or processing, etc. Functions of other parts are similar to those of the related art, which shall not be described herein any further. The parts of the terminal device, or the terminal equipment 1800 may be realized by specific hardware, firmware, software, or any combination thereof, without departing from the scope of this disclosure.

It can be seen from the above embodiment that as the starting position of the time domain resource section used for receiving signals is determined according to the predefined or preconfigured reference time domain resource section, time domain resources on which receiving beams determined by the network device and the terminal equipment are based are uniform, thereby avoiding mismatch of the network device and the terminal equipment in receiving and transmitting beams and ensuring transmission reliability of the system. Furthermore, it is able to avoid receiving a signal transmitted by the network device by using an original assumption of a TCI state and avoid energy loss.

Sixth Embodiment

This embodiment of this disclosure provides a communications system, including a network device and the terminal equipment as described in the fifth embodiment. For example, a structure of the communications system may be as shown in FIG. 1. As shown in FIG. 1, a communications system 100 may include a network device 101 and a terminal equipment 102, a structure and functions of the terminal equipment 102 are as described in the fifth embodiment, and shall not be described herein any further.

It can be seen from the above embodiment that as the starting position of the time domain resource section used for receiving signals is determined according to the predefined or preconfigured reference time domain resource section, time domain resources on which receiving beams determined by the network device and the terminal equipment are based are uniform, thereby avoiding mismatch of the network device and the terminal equipment in receiving and transmitting beams and ensuring transmission reliability of the system. Furthermore, it is able to avoid receiving a signal transmitted by the network device by using an original assumption of a TCI state and avoid energy loss.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIGS. 16 and 17 may either correspond to software modules of procedures of a computer program, or correspond to hardware modules.

Such software modules may respectively correspond to the steps shown in FIGS. 2 and 15. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communications combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of this disclosure containing the above embodiments, following supplements are further disclosed.

1. A signal reception apparatus, including:
a first receiving unit configured to receive a first signal containing first control information at a first time domain resource section based on an assumption that a network device uses a first transmission configuration indication (TCI) state; and
a second receiving unit configured to receive a second signal at a second time domain resource section based on an assumption that the network device uses a second transmission configuration indication state;
a starting position of the second time domain resource section being determined according to a reference time domain resource section, the reference time domain resource section being related to the first control information, and the reference time domain resource section being predefined or preconfigured.

2. The apparatus according to supplement 1, wherein the apparatus further includes:
a third receiving unit configured to receive a third signal at a third time domain resource section based on an assumption that the network device uses a third transmission configuration indication state;
a starting position of the third time domain resource section being determined according to the reference time domain resource section and a threshold, or the starting position of the third time domain resource section being determined according to the reference time domain resource section, the threshold being predefined or preconfigured.

3. The apparatus according to supplement 1, wherein, the apparatus further includes:
a detecting unit configured to detect the first control information in a configured control resource set (CORESET), the configured control resource set containing at least one control resource set.

4. The apparatus according to supplement 3, wherein, the reference time domain resource section is a time domain resource unit at a last position on a time axis in the configured control resource set, or a time domain resource unit next to the configured control resource set on a time axis.

5. The apparatus according to supplement 3, wherein, the reference time domain resource section is a time domain resource unit at a last position of a resource where a search space set in the configured control resource set is located on a time axis, or a time domain resource unit next to the resource where a search space set in the configured control resource set is located on a time axis.

6. The apparatus according to supplement 1, wherein, the reference time domain resource section is a time domain resource unit at a last position in a control resource set where the first control information is located on a time axis, or a time domain resource unit next to the control resource set where the first control information is located on a time axis.

7. The apparatus according to supplement 1, wherein, the reference time domain resource section is a time domain resource unit at a last position of a resource where a search space set is located on a time axis, the search space set being in the control resource set where the first control information is located, or the reference time domain resource section is a time domain resource unit next to the resource where the search space set is located on a time axis.

8. The apparatus according to supplement 1, wherein, the reference time domain resource section is a first time domain symbol, or a second time domain symbol, or a third time domain symbol, in a scheduling unit where the first control information is located, the scheduling unit including a slot or at least one symbol.

9. The apparatus according to supplement 2, wherein, the second signal is a first data channel, the first control information being used to indicate a terminal equipment to receive the first data channel,
and/or, the third signal is a second data channel, the first control information being used to indicate the terminal equipment to receive the second data channel,
and the first data channel and the second data channel being identical or different.

10. The apparatus according to supplement 1, wherein, the second signal contains second control information, the first control information being used to indicate a transmission parameter of the second control information, the transmission parameter including at least one of the following: channel coding, a coding rate, a modulation scheme, a time-frequency resource position, and a transmission configuration indication state.

11. The apparatus according to supplement 1, wherein, the second time domain resource section starts from the reference time domain resource section, or the second time domain resource section starts from a time domain resource unit next to the reference time domain resource section, or the second time domain resource section starts from an N-th time domain resource unit after the reference time domain resource section, N being indicated by the first control information, and N being a natural number.

12. The apparatus according to supplement 2, wherein, the third time domain resource section starts from an M-th time domain resource unit after the reference time domain resource section, M being equal to the threshold, and M being a natural number; or the third time domain resource section starts from an S-th time domain resource unit after the reference time domain resource section, S being indicated by the first control information, and S being a natural number.

13. The apparatus according to supplement 1, wherein, the first transmission configuration indication state is identical to or different from the second transmission configuration indication state.

14. The apparatus according to supplement 13, wherein, the second transmission configuration indication state is identical to or different from the third transmission configuration indication state.

15. The apparatus according to supplement 1, wherein, the first transmission configuration indication state contains at least one transmission configuration indication state, the second transmission configuration indication state contains at least one transmission configuration indication state, and the third transmission configuration indication state contains at least one transmission configuration indication state.

16. The apparatus according to supplement 1, wherein, the first time domain resource section contains at least one time domain resource unit, the second time domain resource section contains at least one time domain resource unit, and the third time domain resource section contains at least one time domain resource unit, the time domain resource units being time domain symbols, or slots, or subframes.

17. A signal reception apparatus, including:
a first setting unit configured to, when a time interval between a time domain resource unit of a received signal and a reference time domain resource section is greater than a threshold, and in a case where received control information does not indicate that the time domain resource unit is used for transmission of the received signal, set transmission configuration indication (TCI) state indication of the time domain resource unit to be having no beam information corresponding to the received signal;

wherein, the reference time domain resource section is related to the control information, and the reference time domain resource section is predefined or preconfigured.

18. The apparatus according to supplement 17, wherein the apparatus further includes:
a second setting unit configured to, in a case where the received signal and a reference signal are transmitted in the same time domain resource unit, when first transmission configuration indication state indication configured for the received signal is different from second transmission configuration indication state indication configured for the reference signal, set the second transmission configuration indication state indication to be having a higher priority relative to the first transmission configuration indication state indication.

19. A terminal equipment, including the apparatus as described in any one of supplements 1-18.

20. A communications system, including the terminal equipment as described in supplement 19.

21. A signal reception method, including:
receiving a first signal containing first control information at a first time domain resource section based on an assumption that a network device uses a first transmission configuration indication (TCI) state; and receiving a second signal at a second time domain resource section based on an assumption that the network device uses a second transmission configuration indication state;

a starting position of the second time domain resource section being determined according to a reference time domain resource section, the reference time domain resource section being related to the first control information, and the reference time domain resource section being predefined or preconfigured.

22. The method according to supplement 21, wherein the method further includes:
receiving a third signal at a third time domain resource section based on an assumption that the network device uses a third transmission configuration indication state;

a starting position of the third time domain resource section being determined according to the reference time domain resource section and a threshold, or the starting position of the third time domain resource section being determined according to the reference time domain resource section, the threshold being predefined or preconfigured.

23. The method according to supplement 21, wherein, the method further includes:
detecting the first control information in a configured control resource set (CORESET), the configured control resource set containing at least one control resource set.

24. The method according to supplement 23, wherein, the reference time domain resource section is a time domain resource unit at a last position on a time axis in the configured control resource set, or a time domain resource unit next to the configured control resource set on a time axis.

25. The method according to supplement 23, wherein, the reference time domain resource section is a time domain resource unit at a last position of a resource where a search space set in the configured control resource set is located on a time axis, or a time domain resource unit next to the resource where a search space set in the configured control resource set is located on a time axis.

26. The method according to supplement 21, wherein, the reference time domain resource section is a time domain resource unit at a last position in a control resource set where the first control information is located on a time axis, or a time domain resource unit next to the control resource set where the first control information is located on a time axis.

27. The method according to supplement 21, wherein, the reference time domain resource section is a time domain resource unit at a last position of a resource where a search space set is located on a time axis, the search space set being in the control resource set where the first control information is located, or the reference time domain resource section is a time domain resource unit next to the resource where the search space set is located on a time axis.

28. The method according to supplement 21, wherein, the reference time domain resource section is a first time domain symbol, or a second time domain symbol, or a third time domain symbol, in a scheduling unit where the first control information is located, the scheduling unit including a slot or at least one symbol.

29. The method according to supplement 22, wherein, the second signal is a first data channel, the first control information being used to indicate a terminal equipment to receive the first data channel, and/or, the third signal is a second data channel, the first control information being used to indicate the terminal equipment to receive the second data channel, and the first data channel and the second data channel being identical or different.

30. The method according to supplement 21, wherein, the second signal contains second control information, the first control information being used to indicate a transmission parameter of the second control information, the transmission parameter including at least one of the following: channel coding, a coding rate, a modulation scheme, a time-frequency resource position, and a transmission configuration indication state.

31. The method according to supplement 21, wherein, the second time domain resource section starts from the reference time domain resource section, or the second time domain resource section starts from a time domain resource unit next to the reference time domain resource section, or the second time domain resource section starts from an N-th time domain resource unit after the reference time domain resource section, N being indicated by the first control information, and N being a natural number.

32. The method according to supplement 22, wherein, the third time domain resource section starts from an M-th time domain resource unit after the reference time domain resource section, M being equal to the threshold, and M being a natural number; or the third time domain resource section starts from an S-th time domain resource unit after the reference time domain resource section, S being indicated by the first control information, and S being a natural number.

33. The method according to supplement 21, wherein, the first transmission configuration indication state is identical to or different from the second transmission configuration indication state.

34. The method according to supplement 33, wherein, the second transmission configuration indication state is identical to or different from the third transmission configuration indication state.

35. The method according to supplement 21, wherein, the first transmission configuration indication state contains at least one transmission configuration indication state, the second transmission configuration indication state contains at least one transmission configuration indication state, and the third transmission configuration indication state contains at least one transmission configuration indication state.

36. The method according to supplement 21, wherein, the first time domain resource section contains at least one time domain resource unit, the second time domain resource section contains at least one time domain resource unit, and the third time domain resource section contains at least one time domain resource unit, the time domain resource units being time domain symbols, or slots, or subframes.

37. A signal reception method, including:

when a time interval between a time domain resource unit of a received signal and a reference time domain resource section is greater than a threshold, and in a case where received control information does not indicate that the time domain resource unit is used for transmission of the received signal, setting transmission configuration indication (TCI) state indication of the time domain resource unit to be having no beam information corresponding to the received signal;

the reference time domain resource section is related to the control information, and the reference time domain resource section is predefined or preconfigured.

38. The method according to supplement 37, wherein the method further includes:

in a case where the received signal and a reference signal are transmitted in the same time domain resource unit, when first transmission configuration indication state indication configured for the received signal is different from second transmission configuration indication state indication configured for the reference signal, setting the second transmission configuration indication state indication to be having a higher priority relative to the first transmission configuration indication state indication.

What is claimed is:

1. A terminal comprising:
a memory; and
processor circuitry coupled to the memory and configured to:
  receive a first signal including first control information at a first time domain resource section according to an assumption that a network device uses a first transmission configuration indication (TCI) state, the first signal being physical downlink control channel (PDCCH), the first control information being downlink control information (DCI); and
  receive a second signal at a second time domain resource section according to an assumption that the network device uses a second transmission configuration indication state, a starting position of the second time domain resource section being determined according to a reference time domain resource section, the reference time domain resource section being a time domain symbol at a last position in the PDCCH where the DCI is located on a time axis.

2. The terminal according to the claim 1, wherein the processor circuitry is further configured to receive a third signal at a third time domain resource section based on an assumption that the network device uses a third transmission configuration indication state, the third time domain resource section starting from an S-th time domain resource unit after the reference time domain resource section, S being indicated by the first control information, and S being a natural number.

3. The terminal according to claim 1, wherein, the processor circuitry is further configured to detect the first control information in one of configured control resource sets (CORESET).

4. The terminal according to claim 3, wherein, the reference time domain resource section is a time domain resource unit at a last position on a time axis in a configured control resource set.

5. The terminal according to claim 3, wherein,
the reference time domain resource section is a time domain resource unit at a last position of a resource where a search space set in a configured control resource set is located on a time axis.

6. The terminal according to claim 1, wherein,
the reference time domain resource section is a time domain resource unit at a last position in a control resource set where the first control information is located on a time axis.

7. The terminal according to claim 1, wherein,
the reference time domain resource section is a time domain resource unit at a last position of a resource where a search space set is located on a time axis, the search space set being in a control resource set where the first control information is located.

8. The terminal according to claim 2, wherein,
the second signal is a first data channel, the first control information being used to indicate to receive the first data channel,
the third signal is a second data channel, the first control information being used to indicate to receive the second data channel, and
the first data channel and the second data channel being identical or different.

9. The terminal according to claim 1, wherein,
the second signal includes second control information, the first control information being used to indicate a transmission parameter of the second control information, the transmission parameter including at least one of the following: channel coding, a coding rate, a modulation scheme, a time-frequency resource position, and a transmission configuration indication state.

10. The terminal according to claim 1, wherein,
the second time domain resource section starts from the reference time domain resource section, or
the second time domain resource section starts from a time domain resource unit next to the reference time domain resource section, or
the second time domain resource section starts from an N-th time domain resource unit after the reference time domain resource section, N being indicated by the first control information, and N being a natural number.

11. The terminal according to claim 1, wherein,
the first transmission configuration indication state is identical to the second transmission configuration indication state.

12. The terminal according to claim 1, wherein,
the first transmission configuration indication state is different from the second transmission configuration indication state.

13. The terminal according to claim 2, wherein,
the first time domain resource section includes at least one time domain resource unit, the second time domain resource section includes at least one time domain resource unit, and the third time domain resource section includes at least one time domain resource unit, the time domain resource units being time domain symbols, or slots, or subframes.

14. A network device comprising:
a memory; and
processor circuitry coupled to the memory and configured to:
transmit, to a terminal, a first signal including first control information at a first time domain resource section, the first signal being received by the terminal according to an assumption that a network device uses a first transmission configuration indication (TCI) state, the first signal being physical downlink control channel (PDCCH), the first control information being downlink control information (DCI); and
transmit, to the terminal, a second signal at a second time domain resource section, the second signal being received by the terminal according to an assumption that the network device uses a second transmission configuration indication state, a starting position of the second time domain resource section being determined according to a reference time domain resource section, the reference time domain resource section being a time domain symbol at a last position in the PDCCH where the DCI is located on a time axis.

15. A communication system comprising:
a network device configured to:
transmit a first signal including first control information at a first time domain resource section, the first signal being physical downlink control channel (PDCCH), the first control information being downlink control information (DCI), and
transmit a second signal at a second time domain resource section, a starting position of the second time domain resource section being determined according to a reference time domain resource section, the reference time domain resource section being a time domain symbol at a last position in the PDCCH where the DCI is located on a time axis; and
a terminal configured to:
receive the first signal at the first time domain according to an assumption that a network device uses a first transmission configuration indication (TCI) state,
receive the second signal at the second time domain resource section according to an assumption that the network device uses a second transmission configuration indication state.

* * * * *